United States Patent
Finsterwalder et al.

(10) Patent No.: US 6,599,628 B1
(45) Date of Patent: Jul. 29, 2003

(54) ORGANIC BASED TITANATE PRIMERS TO BOND FLUORO-CONTAINING COMPOUND TO SILICONE RUBBER

(75) Inventors: Robert N. Finsterwalder, Webster, NY (US); Sandra L. Schmitt, Williamson, NY (US); James G. Russell, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 167 days.

(21) Appl. No.: 09/712,270

(22) Filed: Nov. 15, 2000

(51) Int. Cl.⁷ .................. B32B 25/08; B32B 25/20; B32B 31/26; G03G 15/20
(52) U.S. Cl. ............... 428/421; 428/422; 428/447; 428/448; 399/320; 427/208.2; 427/336; 427/384; 427/402
(58) Field of Search .................. 399/320, 328, 399/339; 492/56; 428/36.8, 36.91, 421, 447, 448, 906, 422; 427/208.2, 336, 384, 402

(56) References Cited

U.S. PATENT DOCUMENTS

| | | | |
|---|---|---|---|
| 3,671,483 A | | 6/1972 | Young .................. 106/285 |
| 3,948,214 A | * | 4/1976 | Thettu .................. 118/60 |
| 4,681,636 A | | 7/1987 | Saito et al. ............. 106/287.15 |
| 4,749,741 A | | 6/1988 | Saito et al. ............. 524/859 |
| 5,238,708 A | | 8/1993 | Blizzard ................ 427/322 |
| 5,318,618 A | * | 6/1994 | Inoue et al. ............ 106/287.16 |
| 5,595,823 A | | 1/1997 | Chen et al. ............. 428/421 |
| 5,599,631 A | | 2/1997 | Chen et al. ............. 428/421 |
| 5,973,067 A | | 10/1999 | Nakamura et al. ........ 524/850 |

OTHER PUBLICATIONS

Hawley's Condensed Chemical Dictionary, 13ᵗʰ Edition, pp. 509–510, Jan. 1999.*

* cited by examiner

Primary Examiner—Ramsey Zacharia
(74) Attorney, Agent, or Firm—Oliff & Berridge, PLC

(57) ABSTRACT

A primer composition of an organic titanate and an alkoxysilane achieves a strong bond between a silicone rubber and a fluoro-containing compound, thereby enabling a composite of these materials to have excellent adhesion. The composite is most useful as a fuser member in a copying device, the silicone rubber being upon an aluminum core. The primer composition preferably includes a solvent such as methyl isobutyl ketone that swells the silicone rubber, thereby permitting the primer composition to penetrate into the silicone rubber layer and further enhance the bond strength.

20 Claims, No Drawings

ORGANIC BASED TITANATE PRIMERS TO BOND FLUORO-CONTAINING COMPOUND TO SILICONE RUBBER

BACKGROUND OF THE INVENTION

1. Field of the Invention

The present invention relates to a method of bonding a fluoro-containing compound to a silicone rubber substrate with a primer composition comprised of an organic based titanate compound and an alkoxysilane compound, as well as to a bonded composite of the foregoing materials.

2. Discussion of Related Art

In the art of electrophotography/electrostatography, heat-softenable toners are widely used in imaging methods wherein electrically charged toner is deposited imagewise on a dielectric or photoconductive element bearing an electrostatic latent image. Following development of the latent image with the toner, the toner is transferred in image-configuration to a surface of an image receiving medium such as, for example, paper or transparent film. The toner image is then fixed in place upon the medium to yield the final image.

A typical method of fixing toner in place on the medium involves applying heat to the toner once it is on the image receiving medium surface to soften it and then allowing or causing the toner to cool. One such fusing method comprises passing the toner-bearing medium sheet through the nip formed by a pair of opposing rolls, at least one of which (usually referred to as a fuser member or roll) is heated and contacts the toner-bearing surface of the receiver sheet in order to heat and soften the toner. The other roll (usually referred to as a pressure member or roll) serves to press the receiver sheet into contact with the fuser roll. The fuser member and pressure member may also take the form of a flat plate or belt.

A fuser member can comprise, for example, a rigid core covered with a resilient material, particularly a silicone rubber. In addition, in electrophotographic fuser systems, fuser members are commonly made with an overcoat layer of a polyfluorocarbon resin or polyfluorocarbon elastomer. Fluorocarbon resins like polytetrafluoroethylene (PTFE) or a copolymer of PTFE and perfluoroalkylvinylether, or fluorinated ethylenpropylene have excellent release characteristics due to very low surface energies, high temperature resistance, and excellent chemical resistance. Polyfluorocarbon elastomers, such as vinylene fluoride-hexafluoropropylene copolymers, are tough, flexible elastomers that have excellent high temperature resistance.

However, due to the low surface energies of the silicone rubber and the fluoro-containing material overcoat, it is very difficult to obtain a good bond between these layers. This is a particular problem in the area of fuser members for electrophotographic and electrostatographic devices where strong adhesion between a silicone rubber and a fluoroelastomer topcoat is necessary for long-term, reliable operation.

U.S. Pat. No. 5,595,823 describes a fuser member useful for heat-fixing an electrographic toner to a substrate. The fuser member has a core and an outer layer. The outer layer includes a cured fluorocarbon random copolymer and particulate filler of aluminum oxide and a material selected from the group consisting of alkali metal oxides, alkali metal hydroxides, and combinations thereof. In a specific embodiment, a silicone rubber layer is coated upon a stainless steel substrate core, the core being primed with a uniform coat of a metal alkoxide type primer, Dow 1200 Prime Coat primer, marketed by Dow Corning Corporation of Midland, Mich., which is described to contain light aliphatic petroleum naptha (85 weight percent), tetra (2-methoxyethoxy)-silane (5 weight percent), tetrapropyl orthosilicate (5 weight percent), and tetrabutyl titanate (5 weight percent).

U.S. Pat. No. 5,599,631 describes a fuser member having as its outermost layer a substantially homogeneous composite comprising: a) a continuous phase of a fluorocarbon elastomer selected from vinylidene fluoride based fluoroelastomers containing hexafluoropropylene and terpolymers of vinylidene fluoride, hexafluoropropylene and tetrafluoroethylene; and b) a discontinuous phase of a fluorinated resin having a molecular weight between about 4,000 and 25,000. Again, it is indicated that a silicone rubber intermediate layer may be applied to a core primed with Dow 1200 primer.

U.S. Pat. No. 5,973,067 describes a primer composition for promoting the adhesion of thermosetting rubbers to substrates having exceptionally inert surfaces, such a nickel, stainless steel and organic resins. The composition comprises: (A) 100 parts, by weight, of an organosilicon compound selected from the group consisting of (1) alkenyltrialkoxysilane and (2) mild hydrolyzates of (1); (B) 0.01–200 parts, by weight, of a platinum compound; (C) 0.1–100 parts by weight of an organic titanic acid ester; and optionally (D) a solvent.

The foregoing patents thus describe primer compositions intended to assist in bonding a silicone rubber to a metal surface.

U.S. Pat. No. 5,238,708 describes a primer composition, and a method for its use to improve adhesion between a silicone substrate and a subsequently applied paint film. The primer composition consists essentially of a mixture of an alkoxysilane, an organotitanate and a tin salt of a carboxylic acid, each component being present in a specific critical molar proportion. Although this patent mentions the use of the primer to enhance adhesion between a silicone rubber and a paint overcoat, it does not indicate that the paint should contain a fluoro-containing compound. Further, it is not taught that the solvent of the primer is a solvent that swells the silicone rubber.

U.S. Pat. No. 3,671,483 discovered that a solution containing a tetraalkyltitanate and a particular silane which has at least one group of the formula $CH_2CH_2—Si(OOCCH_3)_3$ in its molecule is useful as a primer in adhering a silicone rubber to epoxy and polyurethane.

U.S. Pat. No. 4,681,636 discloses a primer composition particularly suitable for bonding fluorosilicone rubber to a substrate. This primer comprises a solution of a t-butyl peroxy-functional silane, a reactive organosilicon compound having at least two alkoxy groups and an organotitanate ester. U.S. Pat. No. 4,749,741 describes primers suitable for promoting adhesion between silicone rubber and plastics or metals. These primers comprise a solution of an unsaturated organotitanate ester and either an organosilicon compound having at least two alkoxy groups or an organohydrogensiloxane (or silane).

Until now, primers used in bonding a overcoat to a silicone rubber still suffer from adhesion failures between the layers during operation as fuser members. What is still desired, then, is development of a primer that can achieve enhanced bonding strength between a fluoro-containing compound overcoat and a silicone rubber substrate.

SUMMARY OF THE INVENTION

It is therefore an object of the present invention to develop a composite of a silicone rubber and a fluoro-containing material in which the bond between the layers is very strong. It is a still further object of the present invention to develop a fuser member containing such composite member for a copying device.

It is a further object of the present invention to develop a primer composition to achieve the desired enhanced bond strength between a silicone rubber and a fluoro-containing material.

These and other objects of the present invention are achieved herein by a composite structure comprising a layer of silicone rubber that is bonded to an overlying layer containing at least one fluoro-containing compound, the bond effected via a primer composition on a surface of the layer of silicone rubber, wherein the primer composition is comprised of at least an organic titanate and an alkoxysilane.

In a further embodiment of the invention, the invention pertains to a fuser member comprising a core overcoated with a first layer of silicone rubber that is bonded to an overlying layer containing at least one fluoro-containing compound, the bond effected via a primer composition on a surface of the layer of silicone rubber, wherein the primer composition is comprised of at least an organic titanate and an alkoxysilane.

In a further embodiment of the invention, the invention pertains to a method of obtaining a bond between a layer of silicone rubber and an overlying layer containing at least one fluoro-containing compound, the method comprising (1) applying a primer composition comprised of at least an organic titanate and an alkoxysilane to a portion of the layer of silicone rubber to which the layer containing at least one fluoro-containing compound will be applied, (2) fixing the primer composition to the layer of silicone rubber to obtain a primed portion, (3) applying the layer containing at least one fluoro-containing compound to the primed portion to form a composite structure, and (4) heating the composite structure.

DETAILED DESCRIPTION OF PREFERRED EMBODIMENTS

Primers containing only a silane compound have proven insufficient in terms of bond strength in bonding a silicone rubber and a fluoro-containing compound. This is particularly problematic when the bond is required for materials to be used in a fuser member. Mechanical strain to facilitate paper stripping from the fuser member surface and the high temperatures required for toner fix when the paper is upon the fuser member are severe conditions demanding a high strength bond between materials of the fuser member in order to avoid failure of the fuser member after only a short period of operation of the copying device.

The present inventors have found that a primer composition comprised at least of an organic titanate and an alkoxysilane can prime the surface of the silane rubber and bond thereto, and can further form a strong bond to an overcoat containing a fluoro-containing compound.

The primer to be used in the present invention thus comprises at least an organic titanate and an alkoxysilane.

As for the organic titanate, it preferably has a formula of

Ti(OR)$_4$ where R is an alkyl radical having from 1 to 8 carbon atoms. Specific examples of suitable organic titanates include tetrabutyl titanate, tetraisopropyl titanate, tetramethyl titanate, ethylmethyldibutyl titanate, tetraoctyl titanate and tetraethylhexyl titanate. In preparing the primer composition, it is most preferred that the organic titanate is tetrabutyl titanate.

The activity of the organic titanate in the primer is due to the dual functionality of both the titanate and the organic (e.g., butyl) structures of the compound. Both structures are hydrophobic and render the composition soluble in an organic solvent system, which insures a uniform composition. Further, the organic titanate serves to displace any water from the surface of the silicone rubber to which it is applied, which displacement serves to enhance the adhesion among the components.

As for the alkoxysilane, any known alkoxysilane compound may be used. Allyl alkoxysilanes are preferred, with allyltrimethoxysilane being most preferred. Examples of other alkoxysilanes that might be used include, for example, methyltrimethoxysilane, vinyltrimethoxysilane, butyltrimethoxysilane, hexyltrimethoxysilane, vinyltriethoxysilane, allyltriethoxysilane, methyltriethoxysilane, dimethyldimethoxysilane, methylvinyldimethoxysilane and methylallyldimethoxysilane.

The alkoxysilane compound also has dual functionality. The alkoxysilane function reacts with silicon atoms of the silicone rubber to which it is applied, forming a bond. The vinyl group (double bond) of the alkoxysilane reacts with fluorine atoms of the fluoro-containing compound that is applied upon the primed portions of the silicone rubber. Thus, a chemical bond is formed to link the dissimilar fluoro-containing compound to the silicone rubber material.

Although the primer composition can be applied (i.e., coated) directly to a silicone rubber at 100% solids, it is preferred to dilute the composition with one or more solvents in order to reduce the application viscosity and limit the thickness of the primer coat. Examples of suitable solvents include, for example, ketones, hexane, heptane, toluene, xylene and mineral spirits.

In a preferred embodiment, the primer composition contains a theta solvent that is capable of swelling the silicone rubber layer to which it is applied. A theta solvent is one where the free energies of the solvent-solvent, solvent-polymer and polymer-polymer interactions are the same. The solvent essentially swells the silicone rubber under layer beneath the surface of the silicone rubber, enabling the active components of the primer composition to penetrate beneath the surface of the silicone rubber. As a result, the bond will not just be at the surface of the silicone rubber, but will also be some distance beneath the surface of the silicone rubber. This permits a much stronger bond to be achieved compared to the use of a primer that binds only at the surface of the silicone rubber. Most preferably, a suitable swelling solvent is a ketone, in particular methyl isobutyl ketone.

In this preferred embodiment, the primer should be applied and permitted to sit for a short time (i.e., have a dwell time) to permit the swelling and penetration to occur prior to fixing the primer to the silicone rubber. It is preferred that the primer dwell time is at least, for example, about 15 minutes, and preferably no longer than about 8 hours.

The primer composition preferably includes from about 1 to 5 mole percent of an organic titanate and from about 3 to about 7 mole percent of the functional alkoxysilane. These components are thoroughly blended to form a homogeneous dispersion or solution. When a solvent or solvent mixture is employed, it is preferred that from about 0.5 to about 12 weight percent of the primer composition is thoroughly dispersed therein.

The primer may also contain other components as needed or desired such as, for example, dyes, pigments, flow additive, and the like.

To form the bond between the silicone rubber layer and the overlying fluoro-containing compound layer, the primer composition is first applied to a silicone rubber substrate layer by any suitable technique known to the art such as, for example, dip coating, spray painting, knife coating, brush coating, etc. The primer is most preferably applied only to those portions of the silicone rubber where a fluoro-containing compound will be bonded.

As the silicone rubber, any well known type of silicone rubber may be used, many of which are commercially available from numerous sources. The preferred silicone rubbers are known as addition cured such as LSRs or high temperature vulcanized known as HTV's which have desirable thermal and mechanical properties.

In a preferred embodiment of the present invention, the silicone rubber is part of a fuser member of a copying (electrostatographic or electrophotographic) device. A preferred structure of a fuser member includes an aluminum substrate, for example an aluminum cylinder core having a diameter of, for example, about 100 mm. The silicone rubber is applied upon the aluminum core via any suitable method and, if desired, using any suitable type of primer. In a typical fuser member, the silicone rubber layer may have a thickness of from, for example, about 5 mm.

Following application of the primer composition to the silicone rubber, the primer is fixed to the silicone rubber through controlled heating and relative humidity conditions. Such control is needed in order to effect the hydrolysis reaction in which the silane is bonded with silicon atoms of the silicone rubber. Most preferably, the fixing occurs at a temperature of from about 65° F. to about 75° F. and at a relative humidity of from about 55% to about 65%. The conditions for dwell, as mentioned above, should preferably be at least about 15 minutes up to and including about 8 hours for essentially all solvent of the primer to be evaporated and for the adhesion reaction to reach an optimum.

Subsequent to the fixing, the fluoro-containing compound material may then be applied to at least the primed portions of the silicone rubber layer. Here again, any suitable application technique may be used such as those mentioned above.

By "fluoro-containing compound" is meant any suitable compound that contains fluoro-substituted groups that can bond with the vinyl groups of the primer composition. Fuser members are often made with an overcoat layer of a polyfluorocarbon resin or polyfluorocarbon elastomer. Fluorocarbon resins such as polytetrafluoroethylene (PTFE) or a copolymer of PTFE and perfluoroalkylvinylether, or fluorinated ethylenepropylene, which have excellent release characteristics due to very low surface energies, high temperature resistance, and excellent chemical resistance, and polyfluorocarbon elastomers, such as vinylene fluoride-hexafluoropropylene copolymers, which are tough, flexible elastomers that have excellent high temperature resistance, may be used. In a preferred embodiment, the fluoro-containing compound is a fluoroelastomer. Commercially available fluoroelastomers include, for example, Viton fluoroelastomers from DuPont-Dow and Fluorel fluoroelastomers from 3M.

In a fuser member, the fluoro-containing compound layer is typically very thinly applied, for example to have a thickness of about 20 microns or so.

After the fluoro-containing compound layer is applied to form the composite structure, the composite structure is subjected to further heating in order to not only cure the fluoro-containing compound, but also to form the bond between the primer active components and the fluoro-groups of the overcoat. The heating cycle is, most preferably for example, 2 hours at 130° F., 2 hours at 200° F., 2 hours at 300° F., 2 hours at 350° F., 2 hours at 400° F. and 6 to 12 hours at 450° F.

By this method, a very strong bond can be formed between the two dissimilar materials of the silicone rubber and the fluoro-containing compound.

The invention is further demonstrated by way of the following example.

EXAMPLE

In this example, both LSR and HTV versions of silicone rubber are primed with a primer composition and then overcoated with a fluoroelastomer preferred to be Viton GF. Example composites are prepared employing a primer composition consisting of 1 to 5 mole percent tetrabutyl titanate and 3 to 7 mole percent of allytrimethoxy silane in heptane. Comparative composites are prepared employing a primer composition comprised only of 3 to 7 mole percent allyltrimethoxy silane in heptane or 3 to 7 mole percent acrylate and epoxy functional alkoxy silanes in heptane.

The composites of the invention and the comparative composites are then evaluated for adhesive strength as follows. A three inch long, half inch wide strip of fabric reinforced primed silicone rubber is bonded to the fluoroelastomer surface. Slits are made along the edges of the strip so that the test area stays within the edges of the strip. The roll is mounted in saddles that support the roll under an Instron Tensile Tester. The free end of the strip is then clamped in the test jaws. The test involves measuring the force to pull the strip off the roll. The test force is measured and the back side of the strip with the attached fluoroelastomer is check to ascertain the type of failure. The preferred failure is cohesive, which indicates that the failure is within the silicone rubber as opposed to an adhesion failure which is within the primer bond.

The composites of the invention exhibit tensile failure that is within the silicone rubber (cohesive) at a pull force of 2.5 to 3 pounds per inch, whereas the comparative composites without the organic titanate material exhibit tensile failure of 0.5 to 1.5 pounds per inch, indicating failure in the bond. Testing in the past established a minimum of 1 to 1.5 pounds per inch required in function. These failures are not cohesive but a failure of the adhesive bond as determined by visual examination.

Further, machine testing of the composites of the invention as a fuser member in a copying device results in no adhesion failure up to at least 750,000 prints.

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A composite structure comprising a layer of silicone rubber that is bonded to an overlying layer containing at least one fluoro-containing compound selected from the group consisting of polyfluorocarbon resins and polyfluorocarbon elastomers, the bond effected via a primer composition on a surface of the layer of silicone rubber, wherein the primer composition is comprised of at least an organic titanate and an alkoxysilane.

2. The composite according to claim 1, wherein the fluoro-containing compound is polyfluorocarbon elastomer.

3. The composite according to claim 1, wherein the organic titanate is tetrabutyl titanate.

4. The composite according to claim 1, wherein the alkoxysilane is allyltrimethoxysilane.

5. The composite according to claim 1, wherein the primer composition further comprises a solvent that swells the silicone rubber.

6. The composite according to claim 5, wherein the solvent is methyl isobutyl ketone or heptane.

7. The composite according to claim 1, wherein the silicone rubber exhibits tensile failure at a pull force of about two times the force required to separate comparative composites in which the organic titanate material was not used.

8. A fuser member comprising a core overcoated with a first layer of silicone rubber that is bonded to an overlying layer containing at least one fluoro-containing compound selected from the group consisting of polyfluorocarbon resins and polyfluorocarbon elastomers, the bond effected via a primer composition on a surface of the layer of silicone rubber, wherein the primer composition is comprised of at least an organic titanate and an alkoxysilane.

9. The fuser member according to claim 8, wherein the fluoro-containing compound is a polyfluorocarbon elastomer.

10. The fuser member according to claim 8, wherein the organic titanate is tetrabutyl titanate.

11. The fuser member according to claim 8, wherein the alkoxysilane is allyltrimethoxysilane.

12. The fuser member according to claim 8, wherein the primer composition further comprises a solvent that swells the silicone rubber.

13. The fuser member according to claim 12, wherein the solvent is methyl isobutyl ketone or heptane.

14. A method of obtaining a bond between a layer of silicone rubber and an overlying layer containing at least one fluoro-containing compound selected from the group consisting of polyfluorocarbon resins and polyfluorocarbon elastomers, the method comprising:

applying a primer composition comprised of at least an organic titanate and an alkoxysilane to at least a portion of the layer of silicone rubber to which the layer containing at least one fluoro-containing compound will be applied;

fixing the primer composition to the layer of silicone rubber to obtain a primed portion, applying the layer containing at least one fluoro-containing compound to the primed portion to form a composite structure, and heating the composite structure.

15. The method according to claim 14, wherein the primer composition further comprises a solvent that swells the silicone rubber to permit the primer composition to penetrate into the layer of silicone rubber.

16. The method according to claim 14, wherein the fixing comprises heating at a temperature of from about 65° F. to about 75° F. at a relative humidity of from about 55% to about 65%.

17. The method according to claim 14, wherein the fixing bonds the alkoxysilane of the primer composition to the silicone rubber.

18. The method according to claim 14, wherein the heating of the composite structure cures the fluoro-containing compound and bonds the fluoro-containing compound to a vinyl group of the alkoxysilane of the primer composition.

19. The method according to claim 14, wherein the organic titanate is tetrabutyl titanate and the alkoxysilane is allyltrimethoxysilane.

20. The method according to claim 14, wherein the method further comprises, as a first step, forming the layer of silicone rubber upon an aluminum substrate.

* * * * *